(12) United States Patent
Kwon

(10) Patent No.: US 7,793,952 B2
(45) Date of Patent: Sep. 14, 2010

(54) KNUCKLE WITH INTEGRATED BALL JOINT AND METHOD OF ASSEMBLY

(75) Inventor: Tae Sung Kwon, Gyeongsangbuk-do (KR)

(73) Assignee: Dong-A Automotive Co., Ltd. (KR)

( * ) Notice: Subject to any disclaimer, the term of this patent is extended or adjusted under 35 U.S.C. 154(b) by 143 days.

(21) Appl. No.: 12/089,347

(22) PCT Filed: Jun. 9, 2006

(86) PCT No.: PCT/KR2006/002210

§ 371 (c)(1),
(2), (4) Date: Apr. 4, 2008

(87) PCT Pub. No.: WO2007/040304

PCT Pub. Date: Apr. 12, 2007

(65) Prior Publication Data

US 2008/0284122 A1    Nov. 20, 2008

(30) Foreign Application Priority Data

Oct. 6, 2005    (KR) .................... 10-2005-0093813
Feb. 14, 2006   (KR) .................... 10-2006-0014163

(51) Int. Cl.
*B62D 7/16* (2006.01)
(52) U.S. Cl. ................ 280/93.511; 280/93.512; 403/134; 403/135; 403/149
(58) Field of Classification Search .......... 280/93.511, 280/93.512; 403/134, 135, 149
See application file for complete search history.

(56) References Cited

U.S. PATENT DOCUMENTS 2,900,196 A * 8/1959 Nienke ................. 280/86.756
3,262,706 A * 7/1966 Hassan .................... 464/175
3,305,617 A * 2/1967 Janis ...................... 264/242

(Continued)

FOREIGN PATENT DOCUMENTS

KR    1020000072076    6/2002

(Continued)

*Primary Examiner*—Eric Culbreth
(74) *Attorney, Agent, or Firm*—Michael Best & Friedrich LLP

(57) ABSTRACT

A ball joint integrated knuckle and an assembling method thereof is provided. The ball joint integrated knuckle includes: a knuckle integrating a housing formed with a first screw thread on its one side surface; and a ball joint having a thread seat formed with a second screw thread, wherein the ball joint is integrated into the knuckle by combining the first screw thread of the housing of the knuckle with the second screw thread of the thread seat of the ball joint. Thus, it is possible to easily attach/detach the ball joint with respect to the knuckle by combining/removing the ball joint using the first screw thread, formed in an inner circumferential surface of the housing integrally formed with the knuckle, and the second screw thread formed in an external circumferential surface of the thread seat. Also, according to the present invention, the ball joint is not manufactured as a finished product, but provided as kit. Thus, costs, which may incur when manufacturing the ball joint as the finished product, may be saved by assembling the ball joint to the housing integrally formed with the knuckle, and thereby manufacturing costs may be reduced.

7 Claims, 6 Drawing Sheets

U.S. PATENT DOCUMENTS

| | | | |
|---|---|---|---|
| 5,876,149 A * | 3/1999 | Dorr et al. | 403/134 |
| 6,527,468 B1 * | 3/2003 | Lindquist et al. | 403/122 |
| 6,561,715 B2 | 5/2003 | Wasylewski et al. | |
| 2005/0051989 A1 | 3/2005 | Jung | |
| 2006/0133891 A1 * | 6/2006 | Cook | 403/134 |

FOREIGN PATENT DOCUMENTS

KR  1020020035343  1/2004

* cited by examiner

PRIOR ART

KNUCKLE WITH INTEGRATED BALL JOINT AND METHOD OF ASSEMBLY

TECHNICAL FIELD

The present invention relates to a ball joint integrated knuckle and an assembling method thereof, and more particularly, to a ball joint integrated knuckle in which a ball joint can easily be attached to or detached from a knuckle, and an assembling method thereof.

BACKGROUND ART

A steering device generally includes a manipulation device, a gear device, a link device, and the like. In this instance, the gear device changes a motion direction of the manipulation device and transfers the changed motion direction to the link device. The link device includes a knuckle assembly in which a tie rod and a ball joint are combined with each other, as a portion of transferring an operation of the gear device to front wheels, and also supporting a relational location of the left and right wheels.

As illustrated in FIG. 1, the knuckle assembly, in which the tie rod and the ball joint are combined with each other, includes a knuckle 100, a ball joint 140, and the tie rod (not illustrated). In this instance, a pair of caliper mounting portions 106*a* and 106*b* are integrally formed with the knuckle 100 to mount a caliper (not illustrated). Also, a pair of downwardly protruding ball joint mounting portions 104*a* and 104*b* are integrally formed with the knuckle 100 in a lower portion thereof.

As shown in a partial section surface 105, the ball joint mounting portion 104*a*, which is integrally formed with the knuckle 100 in the lower portion of the knuckle 100, includes a screw groove 109. In this instance, the partial section surface 105 is to indicate the screw groove 109 formed in the ball joint mounting portion 104*a*. Also, the screw groove 109 is also formed in the ball joint mounting portion 104*b* which becomes a pair with the ball joint mounting portion 104*a*.

As described above, the ball joint 140 is mounted to the ball joint mounting portions 104*a* and 104*b*, which are formed with the screw screws 109 respectively, by using bolts 142*a* and 142*b*. Hereinafter, a method of mounting the ball joint 140 to the pair of ball joint mounting portions 104*a* and 104*b* will be described with reference to FIG. 2.

As illustrated in FIG. 2, the ball joint 140 includes a housing 141, a seat 145, a ball stud 146, a bearing 147, and a dust cover 148. A single finished product, i.e. the ball joint 140 is assembled by assembling each of elements. When the assembly of the ball joint 140 is completed, holes 144*a* and 144*b*, which are formed in the housing 141 are matched with the screw grooves 109, and then the ball joint 140 is fixably assembled to the pair of ball joint mounting portions 104*a* and 104*b* by using the bolts 142*a* and 142*b*.

Like the conventional art, when a ball joint, which is manufactured as a finished product, is installed to a knuckle by a pressurization method, the ball joint is assembled to the knuckle in a state where the ball joint is assembled as a single finished product. Thus, manufacturing costs for assembling the ball joint and the knuckle may be increased. Also, since a space for combining a bolt or giving a pressure to a housing is required in the knuckle, the size of the knuckle becomes large. Thus, the weight of the knuckle assembled with the ball joint also increases.

In addition, when the ball joint is assembled to the knuckle by the conventional combination method, the ball joint may not be partially exchanged for a simple functional problem of the ball joint. Specifically, since the entire ball joint is required to be exchanged, after service (A/S) costs may be required.

DISCLOSURE

Technical Problem

The present invention is conceived to solve the above-described problems in the conventional art, and thus, the present invention provides a ball joint integrated knuckle in which a ball joint can be easily attached to or detached from a knuckle without a combination unit, such as a bolt or a snap ring, by integrating a housing of the ball joint into the knuckle, and an assembling method thereof.

The present invention also provides a ball joint integrated knuckle which can reduce manufacturing costs by providing a ball joint as a kit, not a finished product, to be integrally formed with a knuckle, and also can make great contributions to a lightness of the knuckle by manufacturing the knuckle compactly, and an assembling method thereof.

Technical Solution

According to an aspect of the present invention, there is provided a ball joint integrated knuckle including: a knuckle integrating a housing formed with a first screw thread on its one side surface; and a ball joint having a thread seat formed with a second screw thread, wherein the ball joint is integrated into the knuckle by combining the first screw thread of the housing of the knuckle with the second screw thread of the thread seat of the ball joint.

According to another aspect of the present invention, there is provided an assembling method of a ball joint integrated knuckle, the method including: combining a dust cover with a thread seat; preparing a knuckle which is integrated into a housing formed with a first screw thread; inserting a ball stud into a bearing; inserting the bearing into a thread seat formed with a second screw thread; and combining the thread seat with the housing by combining the first screw thread with the second screw thread.

ADVANTAGEOUS EFFECTS

As described above, in a ball joint integrated knuckle according to the present invention, a ball joint may be easily attached to or detached from a knuckle by integrally forming a housing of the ball joint with the knuckle, and combining the ball joint with the knuckle by a first screw thread, which is formed in an inner circumferential surface of the housing integrally formed with the knuckle, and a second screw thread. Also, costs which may occur when manufacturing the ball joint as a finished product, may be saved and thereby manufacturing costs may be reduced by providing the ball joint as a kit without assembling the ball joint as the finished product, and assembling the ball joint to the housing formed in the knuckle. Also, the knuckle, which is provided with the ball joint, may be compactly manufactured.

BEST MODE

Figure 1:
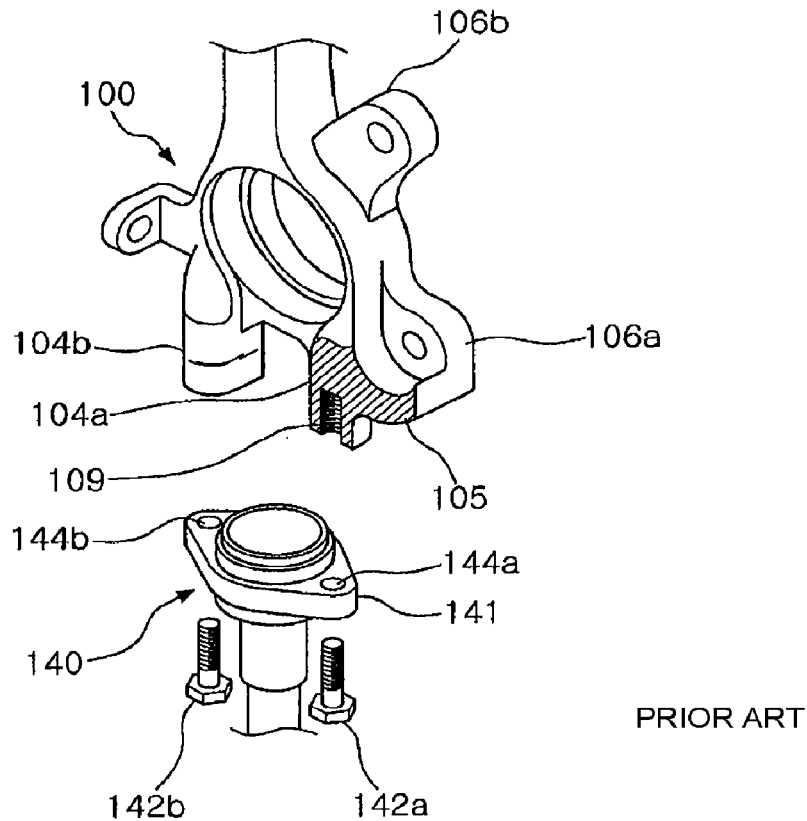
FIG. 1 is a perspective view illustrating a knuckle combined with a ball joint by using bolts according to a conventional art.
Figure 2:
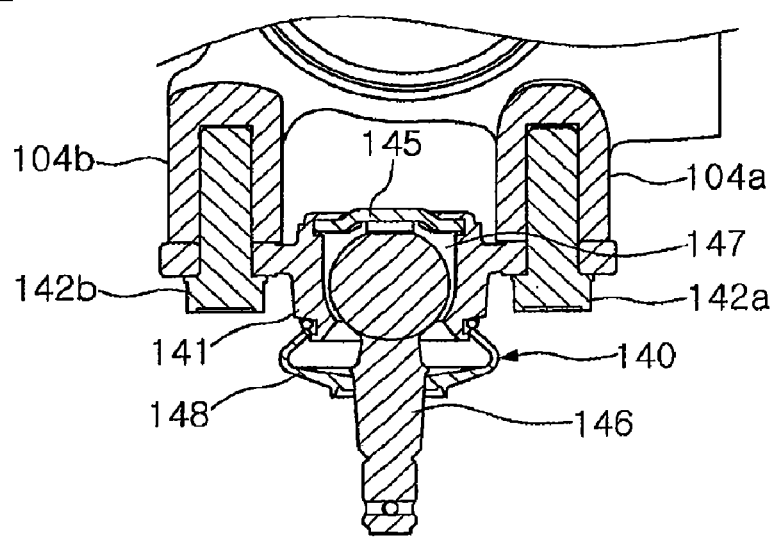
FIG. 2 is an enlarged cross-sectional view illustrating the ball joint illustrated in FIG. 1.

Reference will now be made in detail to embodiments of the present invention, examples of which are illustrated in the accompanying drawings, wherein like reference numerals refer to the like elements throughout. The embodiments are described below in order to explain the present invention by referring to the figures.

A ball joint integrated knuckle 10 according to a first embodiment of the present invention includes a knuckle 20 and a ball joint 30.

Figure 3:
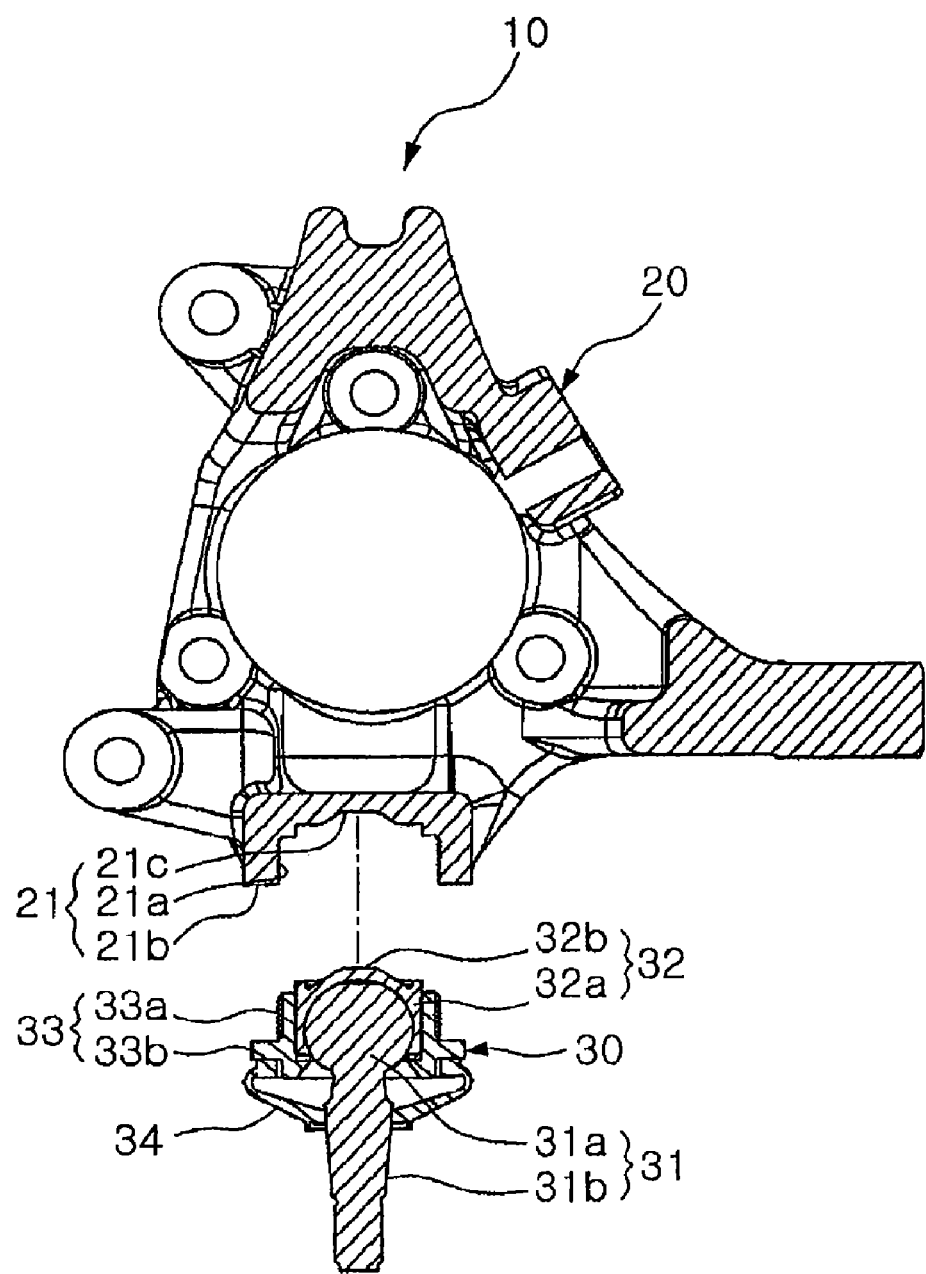
FIG. 3 is a cross-sectional view illustrating a ball joint integrated knuckle according to an exemplary embodiment of the present invention.
Figure 4:
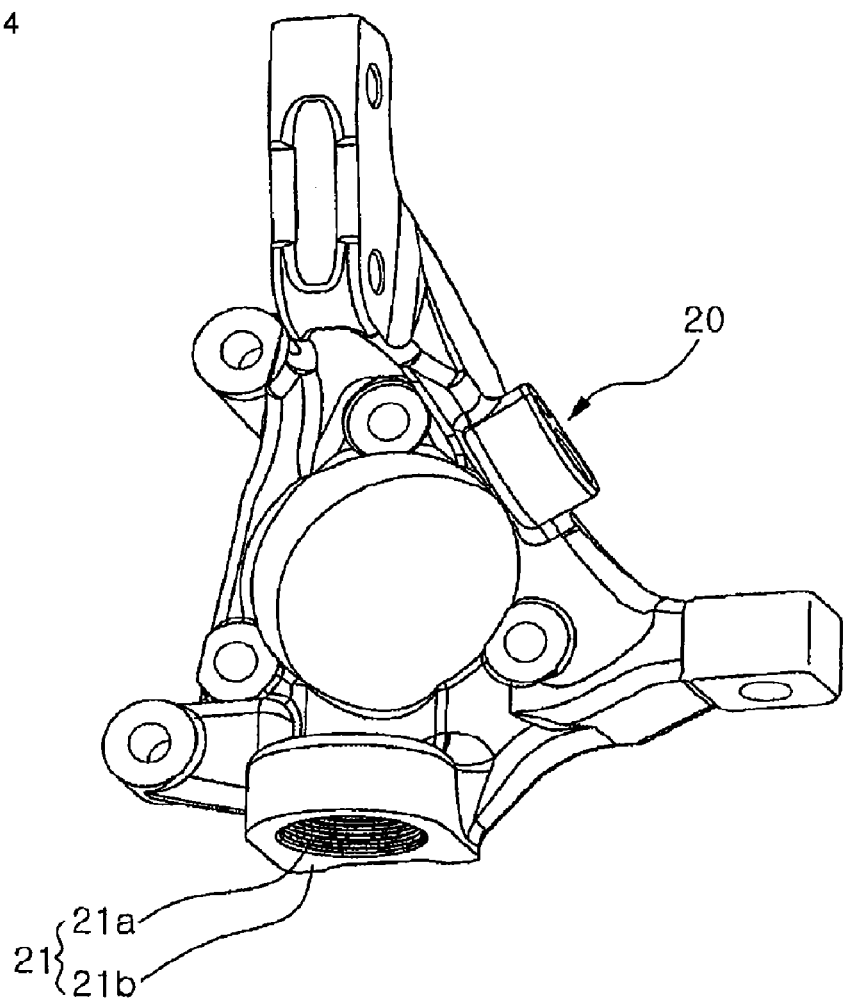
FIG. 4 is a perspective view illustrating a knuckle illustrated in FIG. 3.

As illustrated in FIGS. 3 and 4, the knuckle 20 is integrally formed with a housing 21 in a lower portion of the knuckle 20. A first screw thread 21a is formed in an inner circumferential surface of the housing 21. A stopper surface 21b is formed in a bottom surface of the housing 21. Also, a bearing receiving groove 21c is formed in an upper portion of the first screw thread 21a. In this instance, the housing 21 is a part which constitutes the ball joint 30, but in the present invention, the housing 21 is integrally formed with the knuckle 20.

Figure 5:
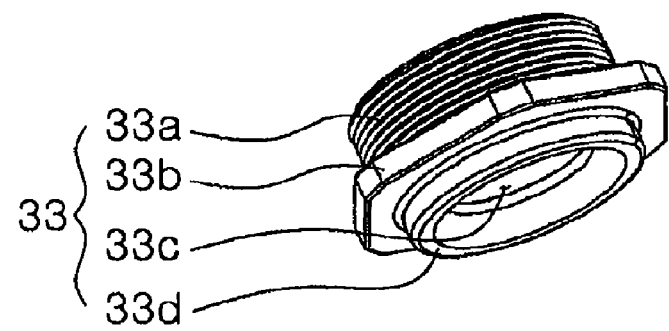
FIG. 5 is a perspective view illustrating a thread seat illustrated in FIG. 3.

The ball joint 30 is combined with the housing 21 which is formed with the first screw thread 21a, the stopper surface 21b, and the bearing receiving groove 21c. As illustrated in FIGS. 3 through 5, the ball joint 30 includes a ball stud 31, a bearing 32, a thread seat 33, and a dust cover 34. Such the ball joint 30 is combined with the housing 21 which is formed in the lower portion of the knuckle 20.

The ball stud 31 is inserted into the bearing 32. The bearing 32 includes a bearing body 32a and a bearing protrusion 32b. In this instance, the bearing protrusion 32b is closely attached to the bearing receiving groove 21c of the housing 21, and the ball stud 31 is inserted into the bearing body 32a.

Also, the bearing 32 is provided in the thread seat 33. As illustrated in FIG. 5, the thread seat 33 is formed with a hole 33c to insert the bearing 32, an externally protruding fixing member 33b, and a second screw thread 33a which is formed in an outer circumferential surface of the fixing member 33b. In this instance, the second screw thread 33a, which is formed in an outer circumferential surface of the thread seat 33, is engaged with the first screw thread 21a which is formed in the inner circumferential surface of the housing 21. The ball joint 30 is combined with the housing 21 of the knuckle 20.

When assembling the ball joint 30 to the housing 21 of the knuckle 20, the fixing member 33b is formed in a shape of a polygon to be externally protruded from the thread seat 33. More desirably, the fixing member 33b can be formed in a shape of a hexagon to be turned and thereby fastened to the housing 21 by using a spanner (not illustrated) or a wrench (not illustrated).

Hereinafter, a method of integrally assembling the ball joint 30 and the knuckle 20 by combining the first thread seat 21a of the housing 21 and the second screw thread 33a of the thread seat 33 will be described with reference to FIGS. 3 and 4.

As illustrated in FIG. 3, the dust cover 34 is press fitted and assembled to a receiving portion 33d (see FIG. 5) of the thread seat 33. Also, a ball-shaped portion 31a of the ball stud 31 is inserted into the bearing 32. When the ball-shaped portion 31a is inserted into the bearing 32, the ball-shaped portion 31a is inserted into the bearing body 32a in a state where the stud portion 31b faces a downward direction.

When the ball stud 31 is completely inserted into the bearing 32, the bearing 32 inserted with the ball stud 31 is inserted into the thread seat 33. In this instance, the bearing 32 is inserted into the hole 33c which constitutes the thread seat 33. When the bearing 32 is inserted into the hole 33c of the thread seat 33, the thread seat 33 formed with the second screw thread 33a is combined with the housing 21 of the knuckle 20 which is formed with the first screw thread 21a.

To combine the first screw thread 21a of the housing 21 with the second screw thread 33a of the thread seat 33, the fixing member 33b formed in the thread seat 33 is rotated and thereby combined. Specifically, when the thread seat 33 is inserted in the housing 21 to some extents, the fixing member 33b is rotated in a state where a spanner (not illustrated) or a wrench (not illustrated) is combined with the fixing member 33b, and thereby the thread seat 33 is inserted into the housing 21.

When inserting the thread seat 33 into the housing 31, the thread seat 31 is inserted into the housing 21 so that the bearing protrusion 32b of the bearing 32, which includes the bearing body 32a and the bearing protrusion 32b, may closely contact with the bearing receiving groove 21c which is formed in the housing 21. In this instance, when an upper surface of the fixing member 33b of the tread seat 33 closely contacts with the stopper surface 21b which is formed in the housing 21, the thread 33 is tightly fixed to the housing 21.

Hereinafter, a ball joint integrated knuckle according to a second embodiment of the present invention will be described with reference to FIGS. 6 and 7.

A ball joint integrated knuckle 10 includes a housing 21 integrally formed with a knuckle 20 on one side surface of the knuckle 20, having a first screw thread 22 on its one inner surface, and having at least one fixing groove 24 on its one external end, and a ball joint 30 including having a thread seat 36 formed with a second screw thread 36c on its one external end, and formed with a first flange portion 36a and a second flange portion 36b on its another end. In this instance, the first flange portion 36a is caulked into the fixing groove 24 to prevent a screw combination from releasing in a state where the ball joint 30 is inserted and integrated into the housing 21 by engaging the first screw thread 22 with the second screw thread 36c.

Figure 6:
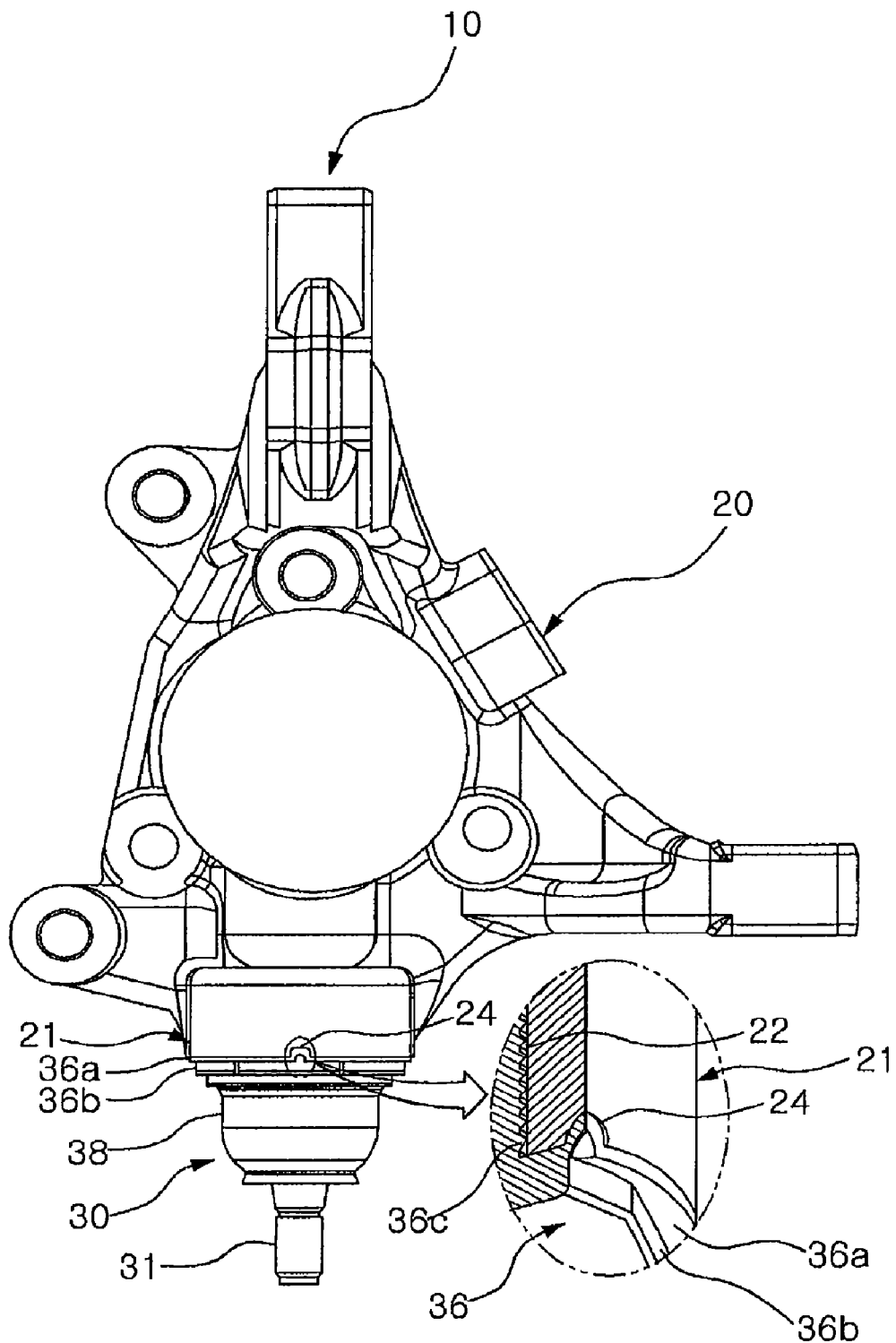
FIG. 6 is a cross-sectional view illustrating a ball joint integrated knuckle according to another exemplary embodiment of the present invention.
Figure 7:
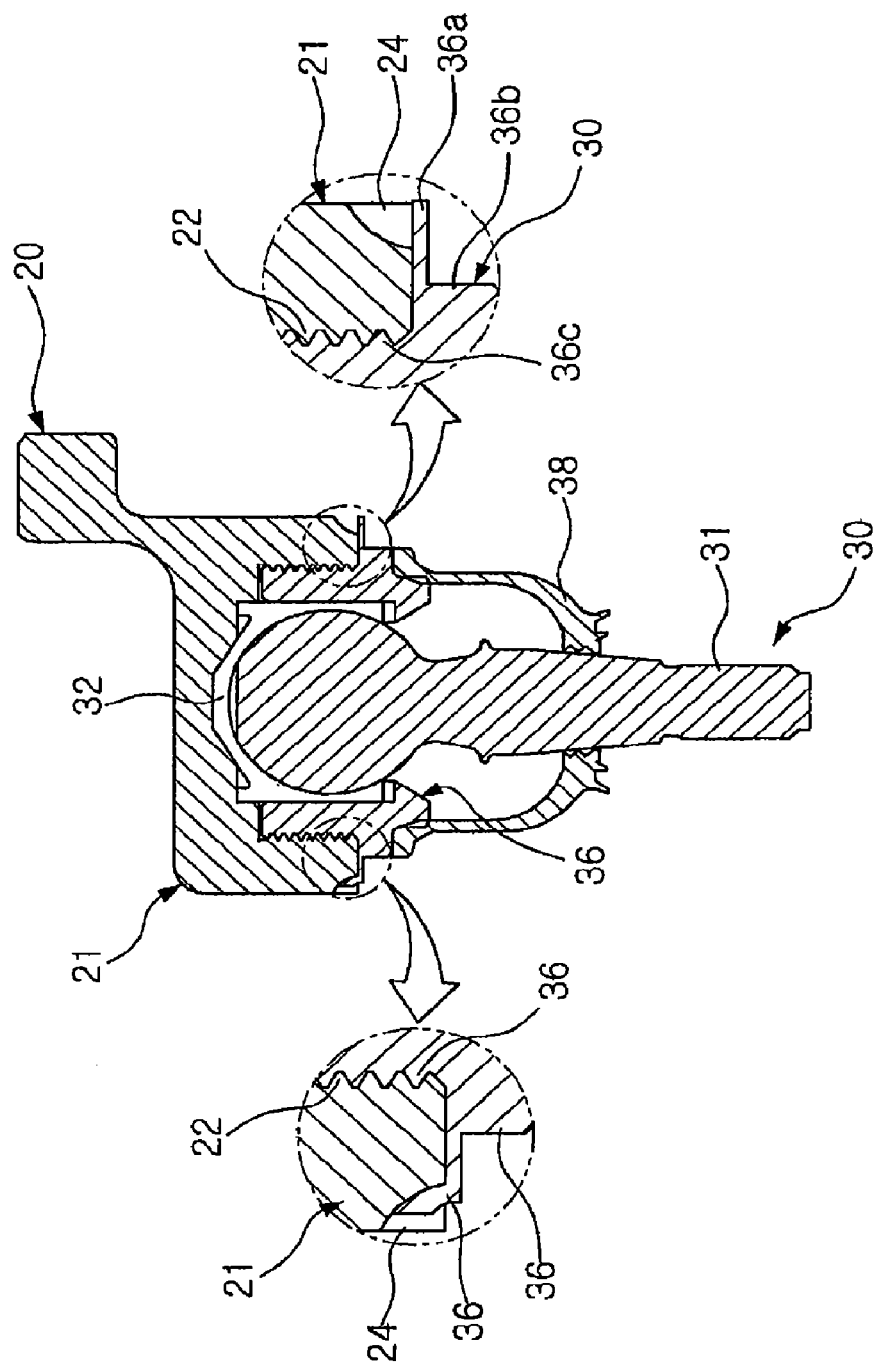
FIG. 7 is an enlarged cross-sectional view illustrating a ball joint integrated knuckle.

As illustrated in FIGS. 6 and 7, the ball joint integrated knuckle 10 according to the present invention is configured and constructed by combining the ball joint 30 with the housing 21 of the knuckle 20.

Figure 8:
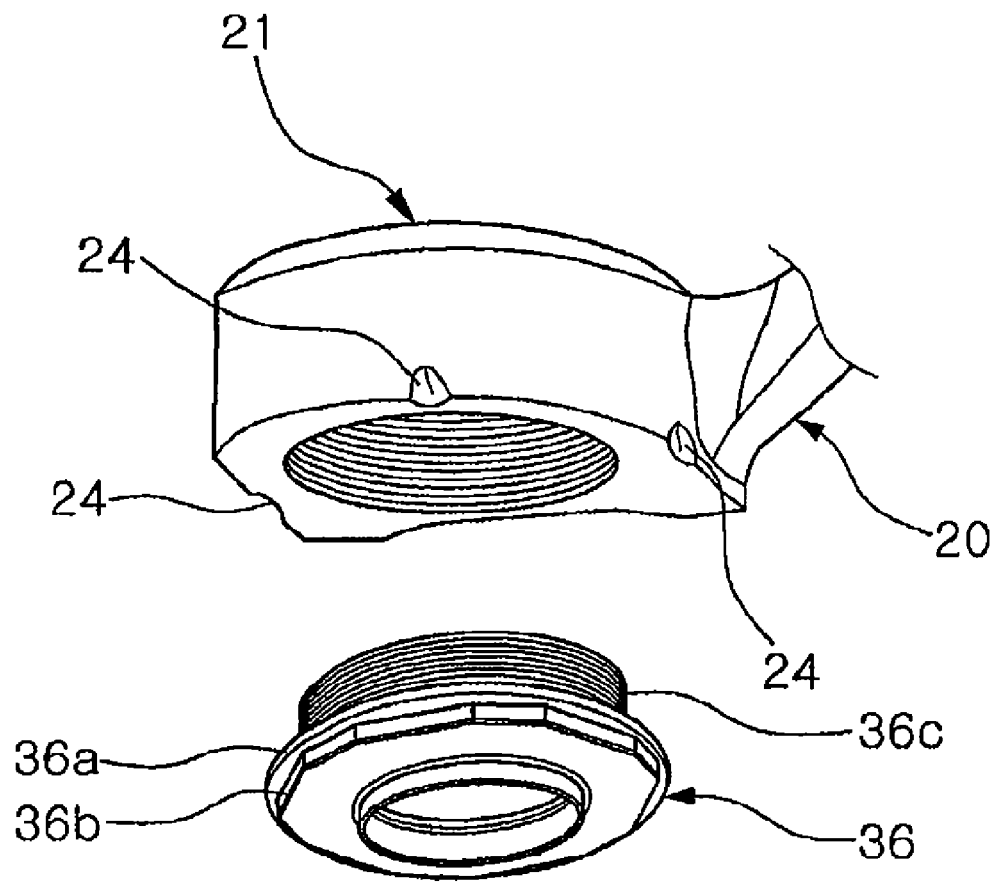
FIG. 8 is a perspective view illustrating a housing and a thread seat illustrated in FIG. 7.

The housing 21 is integrally formed with the knuckle 20 on one side surface thereof. Also, the housing 21 is formed with the first screw thread 22 on its inner one end, and the fixing groove 24 on its external one end. In this instance, at least one fixing groove 24 is formed in one end of the housing 21 as illustrated in FIG. 8.

The ball joint 30 includes a ball stud 31, a bearing 32, a thread seat 36, and a dust cover 38. The thread seat 36 is formed with the second screw thread 36c on its one external end, and formed with the first flange portion 36a and the second flange portion 36b on its another end. In this instance, the first flange 36a, which is formed in the thread seat 36, is formed in a shape of a circle, and the second flange 36b is formed in a shape of a polygon.

The first flange portion 36a is formed in the shape of a polygon for the caulking operation, and thus, a maximum radius of the second flange portion 36b is formed to less than a radius of the first flange portion 36a. Specifically, the maximum radius of the second flange portion 36b corresponding to a radius of a circle, which is formed of out-most points from a center of the second flange portion 36b in the shape of a polygon, is formed to less than the radius of the first flange portion 36a which is in the shape of a circle.

Hereinafter, a process of assembling the ball joint 30 to the housing 21, which is constructed as described above, will be described.

Initially, the dust cover 34 is provided to the receiving portion 33d of the thread seat 33. The ball stud 31 is inserted into the bearing 32. When the ball stud 31 is completely inserted into the bearing 32, the thread seat 36 is assembled to the bearing 32. Also, when the threat seat 36 is completely assembled to the bearing 32, the housing 21 and the thread seat 36 are combined by using the first screw thread 22 formed in the housing 21 and the second screw thread 36c formed in the thread seat 36.

Also, when combining the housing 21 with the thread seat 36 using screws, the second flange portion 36b, which is formed in the thread seat 36 in the shape of a polygon, is assembled to the housing 21 by rotating the thread seat 36 using a spanner (not illustrated) or a fastening tool (not illustrated). When the thread seat 36 is assembled to the housing 21, a corner portion of the first flange portion 36a is caulked into the fixing groove 24 which is formed in the housing 21, as illustrated in FIG. 7.

The caulking operation will be further described in detail. Specifically, when the thread seat 36 is combined with the housing 21 by screwing them together, in this state, a load is applied to a corner portion of the first flange portion 36a, which is located in at least one fixing groove 24 formed in the housing 21, and thereby the thread seat 36 is fixably caulked into the housing 21.

When the thread seat 36 is fixed to the housing 21 via the caulking operation, it is possible to prevent the screw combination from releasing even when an external impact is given to the ball joint 30 integrally formed with the knuckle 20 by combining the first screw thread 22 formed in the housing 21 and the second screw thread 36c formed in the thread seat 36.

INDUSTRIAL APPLICABILITY

According to the present invention, there is provided an improved ball joint integrated knuckle in which a housing and a knuckle are integrally formed, and a ball joint can be easily attached to or detached from the knuckle.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

I claim:

1. A knuckle with an integrated ball joint comprising:
   a knuckle integrating a housing formed with a first screw thread on a side surface thereof; and
   a ball joint having a thread seat formed with a second screw thread,
   wherein the ball joint is integrated into the knuckle by combining the first screw thread of the housing of the knuckle with the second screw thread of the thread seat of the ball joint,
   wherein the housing of the knuckle is formed with a stopper surface on one end, and is formed with a bearing receiving groove on another end.

2. The knuckle with an integrated ball joint of claim 1, wherein the thread seat of the ball joint has a hole to insert a bearing, and has a fixing member on an outside surface thereof.

3. The knuckle with an integrated ball joint of claim 2, wherein the fixing member is formed in a shape of a polygon.

4. A knuckle with an integrated ball joint comprising:
   a housing integrally formed with a knuckle on a side surface thereof, having a first screw thread on an inner surface, and having at least one fixing groove on an external end of the housing; and
   a ball joint including a thread seat formed with a second screw thread on an one external end of the ball joint, and formed with a first flange portion and a second flange portion on another end,
   wherein the first flange portion is caulked into the fixing groove to prevent a screw combination from releasing in a state where the ball joint is integrated into the housing by combining the first screw thread with the second screw thread.

5. The knuckle with an integrated ball joint of claim 4, wherein the first flange portion of the ball joint is formed in a shape of a circle, and the second flange portion is formed in a shape of a polygon.

6. The knuckle with an integrated ball joint of claim 4, wherein a maximum radius of the second flange portion of the ball joint is less than a radius of the first flange portion.

7. An assembly method of a knuckle with an integrated ball joint, the method comprising:
   combining a dust cover with a thread seat;
   preparing a knuckle including an integral ball joint housing formed with a first screw thread;
   inserting a ball stud into a bearing;
   inserting the bearing into a thread seat formed with a second screw thread;
   combining the thread seat with the housing by combining the first screw thread with the second screw thread; and
   applying a load to a corner portion of a first flange portion, which is located in at least one fixing groove formed in the housing, and thereby caulking the thread seat into the housing, after combining the thread seat with the housing.

* * * * *